Figure 1:
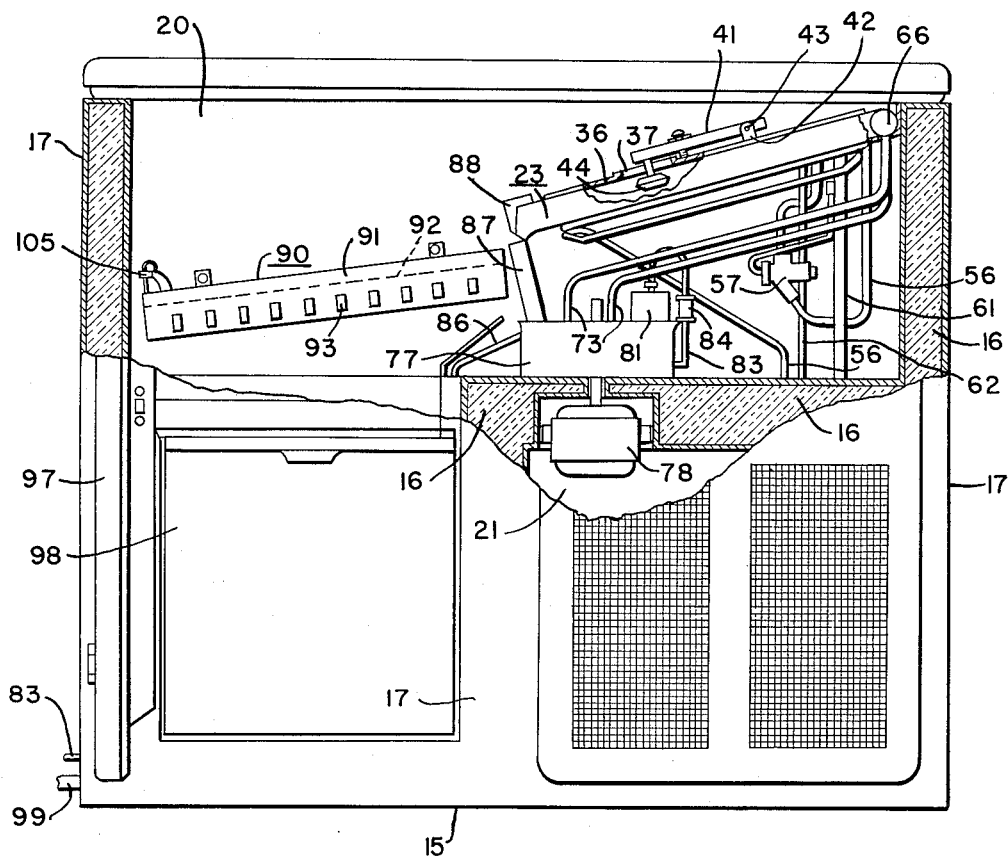

May 29, 1956 J. R. PICHLER 2,747,375
ICE MAKING APPARATUS
Filed May 14, 1953 2 Sheets-Sheet 1

INVENTOR.
Joseph R. Pichler
BY
R.R. Candor.
Attorney.

INVENTOR.
Joseph R. Pichler
BY
R. R. Candor.
Attorney.

2,747,375
Patented May 29, 1956

2,747,375

ICE MAKING APPARATUS

Joseph R. Pichler, Dayton, Ohio, assignor to General Motors Corporation, Detroit, Mich., a corporation of Delaware Application May 14, 1953, Serial No. 355,061

2 Claims. (Cl. 62—4)

This invention relates to refrigeration and particularly to ice block making or freezing apparatuses.

I have found that the water supply to an ice cubelet maker cabinet if interrupted or turned off for a sufficient period of time while the power to a refrigerating system, pump and controls of the ice maker apparatus is left on, residual water in a reservoir, pump, valves and/or conduits thereof located within the freezing or low temperature chamber of the apparatus will freeze and cause damage or breakage. This is due to the fact that the operation of a refrigerating system associated with such apparatus is usually cyclically controlled by thermostatic means responsive to a predetermined accumulation of ice on the freezing element or evaporator thereof. Thus continued operation of the refrigerating system in an apparatus of this type without the addition of water to the apparatus never creates a sufficient building up of ice to cause actuation of the thermostatic control to stop the freezing cycle of the refrigerating system. Water is ordinarily supplied to ice making apparatuses under pressure, and I therefore contemplate the provision of means in an ice block making apparatus which is actuated in response to a failure in the water supply thereto for arresting or rendering the refrigerating system associated with the apparatus inoperative to thereby prevent any water trapped in reservoirs, pumps, valves and conduits within the low temperature zone of the apparatus from freezing.

An object of my invention is to provide an improved ice cube making and storage apparatus which is completely automatic in operation.

Another object of my invention is to provide in ice block making apparatus having a refrigerating system associated therewith means for arresting or rendering the refrigerating system inoperative when the supply of water to be frozen thereby fails.

A further object of my invention is to provide an ice making apparatus which functions automatically to produce small ice blocks or cubelets of ice, as long as the demand therefore exists, with a safety device actuated in response to a failure in water pressure in the water supply main leading to the apparatus for preventing freezing of residual water or water trapped in elements of the apparatus located within the low temperature zone thereof to thereby eliminate damaging or breaking such elements.

A still further and more specific object of my invention is to provide an ice making apparatus having a refrigerating system associated therewith including an evaporator which system is alternately rendered effective to freeze water directed to the evaporator into ice and ineffective in succession for causing the temperature of the evaporator to increase above 32° F. with a means for arresting the alternate successive cycles of operation of the refrigerating system when the water supply to the apparatus fails.

Further objects and advantages of the present invention will be apparent from the following description, reference being had to the accompanying drawings, wherein a preferred form of the present invention is clearly shown.

Figure 2:
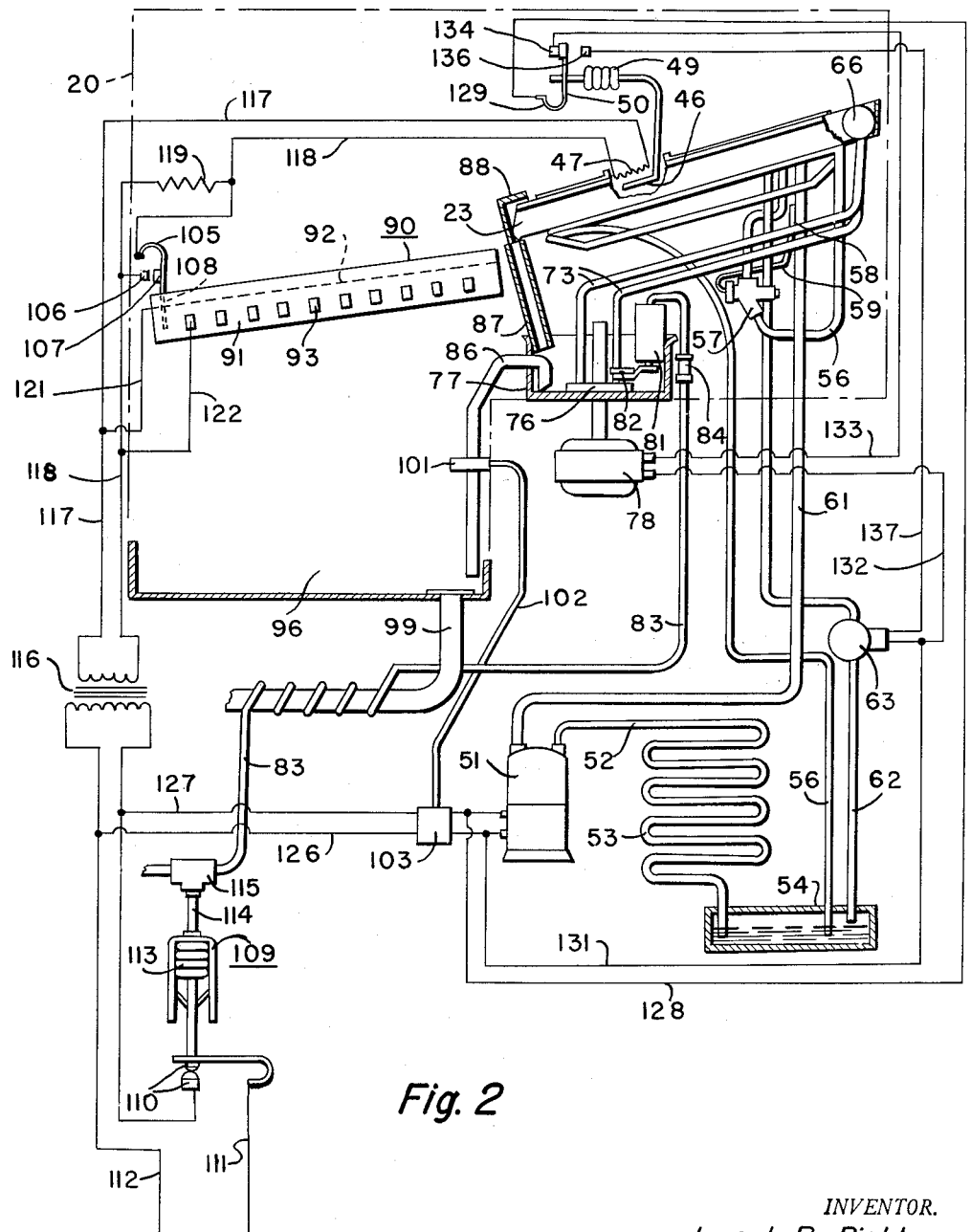

In the drawings:

Figure 1 is a front view of an ice maker apparatus having my invention embodied therein and showing the cabinet thereof partly in section and partly in elevation; and Figure 2 is a diagrammatic view of various elements of the ice making apparatus disclosed in Figure 1 and shows an electrical circuit therefore having my safety device interposed in the power main leading thereto.

An ice making apparatus to which my invention is particularly applicable is illustrated and fully described in the copending application of Marshall W. Baker, S. N. 278,928, filed March 29, 1952, entitled Refrigerating Apparatus, and assigned to the same assignee of the present application. Reference to this copending application is made for a clear understanding of the ice making apparatus herein more or less concisely shown and described. Referring to the drawings I show in Figure 1 thereof an ice making apparatus, of the type capable of producing small blocks or cubelets of ice, including a cabinet 15 comprising a plurality of walls 17 having any suitable or conventional insulating material 16 therein forming an insulated compartment 20. Compartment 20 is horizontally elongated at its upper portion with respect to its lower portion and extends over a non-insulated machine compartment 21 provided in the cabinet. An inclined unitary freezing member 23 is stationarily mounted, preferably at an angle, in the upper portion of compartment 20 above the machine compartment 21. The freezing member 23 is a refrigerant evaporator and forms part of a closed refrigerating system associated with cabinet 15 and to be hereinafter described. Member 23 has a flat upper surface and is formed by superimposing a flat metal plate upon an embossed metal plate and brazing the plates together in a manner which is now well known to those skilled in the sheet metal evaporator art. The embossations in the one plate form refrigerant evaporating or expansion passages within the freezing member 23. A metal cover 36 is spaced from the flat upper surface of member 23 and is provided with an opening 37 which receives a part of a thermostatic means. This thermostatic means comprises an adjustable arm 41 having its one end pivotally mounted to a bracket 42, welded upon cover 36, by a pin 43. The other end of arm 41 carries a feeler receptacle 44 containing a coiled tube 46 and a coiled electrical heating element 47 disposed thereabove (see Figure 2). Heating element 47 is a one-half to five watt capacity electric heater. The feeler receptacle 44 is preferably made adjustable in any suitable manner relative to the flat upper surface of freezing member 23 so as to vary the thickness of a slab of ice formed on the top surface of evaporator member 23. Tube 46 has its end at the coiled portion thereof sealed and has its other end connected to an expansible and contractable element 49 located in a suitable or conventional electric snap switch 50 (see Figure 2). A volatile fluid is sealed in tube 46 and element 49 so as to render switch 50 thermally responsive. The coiled heating element 47 has wire connections with a low voltage electric circuit to be hereinafter described. As before seated the freezing member 23 forms the refrigerant evaporating portion of a closed refrigerating system and has a plurality of conduit connections with a refrigerant translating device. The refrigerant translating device of the refrigerating system is mounted within machine compartment 21 and comprises a motor-compressor unit 51 (see Figure 2) connected by conduit 52 with a condenser 53, which may be cooled in any suitable or conventional manner. Condenser 53 is connected to a receiver 54 and a conduit 56 connects this receiver with the refrigerant evaporating passages within the member 23. A thermostatic expansion valve 57 is interposed in conduit 56 and has a thermal bulb 58 connected thereto by a tube 59 for operating valve 57 as is conventional in the art. The bulb 58 is secured and responsive to the temperature of the gaseous refrigerant return conduit 61 leading to unit 51. The outlet of evaporator 23 is connected by a conduit 61 to the intake side of the compressor of the motor-compressor unit 51 while a conduit 62 extending from the top of receiver 54 is connected to a solenoid valve 63 having a conduit connecting the same directly to the refrigerant expansion passages in evaporator member 23. Valve 63 normally closes conduit 62 to prevent its communication with the passages in member 23 during a refrigerating cycle of operation of the refrigerating system.

Means is provided for flowing a film of water over the freezing evaporator 23 from a main or supply pipe containing water under pressure. This means comprises a manifold in the form of a header 66 having a plurality of horizontally aligned and spaced apart small holes or orifices therein along its length. Header 66 has supply conduits 73 connected thereto and these conduits 73 communicate with a centrifugal or the like water pump 76 located in the bottom of a water sump or reservoir forming receptacle 77. A motor 78, below receptacle 77 and outside of compartment 20, is employed to operate the water pump 76. A valve 81, actuated by a float 82, controls the flow of water through a water main or supply pipe 83, containing water under pressure, into the sump or reservoir 77. Receptacle or reservoir 77 is also provided with a siphon pipe 86 the purpose of which will be hereinafter described. A relatively long flat funnel-like member 87, of substantially rectangular shape in cross sectional contour, is adapted to receive water directed over and flowing from the freezing member 23 so as to convey or return this water to the sump or reservoir receptacle 77. A baffle 88 is hingedly supported on member 23 to prevent excessive water splash and to permit this baffle to be moved out of the way when a slab of ice is released from the freezing member 23.

In the upper left hand portion of compartment 20 there is mounted an ice cutter, grid or dissector 90 which comprises a frame 91 having sets of spaced apart wires 92 and 93 extending thereacross in opposite directions to one another. There is a storage bin 96 (see Figure 2) provided in cabinet 15 below the ice cutter 90 for receiving ice blocks or cubelets therefrom. The bin 96 is normally closed by an insulated door structure 97 and an inner tiltable metal retainer or door 98 (see Figure 1). A drain pipe 99 leads from the bottom of bin 96 (see Figure 2) to convey water, entering the bin from receptacle 77 and water from melting ice in the bin 96, out of the cabinet. A thermal bulb 101 (see Figure 2) extends through an insulated wall 17 of bin 96 and is located within bin 96 at a position therein to be contacted by and responsive to a predetermined accumulation of ice blocks received in the bin. A tube 102 has its one end connected to bulb 101 and has its other end connected or sealed to an expansible and contractable bellows mounted in a bin thermostatic electric switch 103 of any desired or conventional construction. Bulb 101, tube 102 and the bellows in electric switch 103 are charged with a volatile fluid and then sealed to form a temperature responsive unit for actuating switch 103. A switch 105, having contacts 106 and 107 one of which is mounted on a movable arm 108, is associated with the left side of ice cutter 90. Arm 108 is disposed in the path of and is adapted to be struck and moved by a cake or slab of ice released from member 23 and slidable therefrom onto cutter 90 for a purpose to be hereinafter described. In accordance with my invention I provide means for rendering the motor-compressor unit 51 of the refrigerating system of the present ice making apparatus inoperative in response to failure in pressure in the water pressure main or supply pipe 83. For this purpose I provide a pressure operated snap acting switch 109, disclosed in diagrammatic form, which may be of any suitable or conventional construction. Switch 109 includes contacts 110 connected in series with one of two conductors 111 or 112 which controls the flow of electric current, in a manner to be presently described, from a source of supply thereof to the electric wiring circuit for the ice making apparatus. This switch 109 also includes a bellows 113 connected, by pipe 114, to a T connector 115 interposed in the water main or supply pipe 83. Bellows 113 is in open communication with the pressure, usually between ten to eighty pounds per square inch, of supply water in the main leading to pipe 83.

Electrical circuit

The one hundred fifteen volt power supply means or conductors 111 and 112 normally lead to a wiring circuit for controls, switches, valves and electrically energized driving elements of the ice making apparatus and the refrigerating system associated therewith. A part of the wiring circuit of the apparatus includes a low voltage, say, for example, an eleven volt transformer 116 to which the supply conductors 111 and 112 are connected. A wire 117 leads from transformer 116 to the heater 47, in the feeler receptacle 44 of thermostatic means or switch 50, and a wire 118 leads from transformer 116 to contact 106 of switch 105. When contacts 106 and 107 of switch 105 are closed another portion of wire 118, attached to arm 108 of switch 105, leads to the other side of heater 47 of switch 50. A resistance jumper wire 119, in wire 118, by-passes switch 105 and continuously energizes heater 47 with approximately one-half watt current. This provides the feeler receptacle 44 of the ice thickness thermostat at all times with a small amount of heat to insure that the interior thereof will remain dry. A branch wire 121 leads from wire 117 to wires 92 of the ice cutter 90 and a branch wire 122 leads from wire 118 to wires 93, which are connected in series with wires 92, to continuously energize the dissector or grid 90. The wires and connections just described complete the low voltage circuit incorporated in the present ice cube maker. The one hundred fifteen volt circuit includes a wire 126 branched from power main 112 and leading into the bin thermostatic switch 103. Another wire 127 branches from power main 111 and also leads into the bin thermostatic switch 103. The wires 126 and 127 extend from switch 103 to the electric motor of the motor-compressor unit 51 to normally cause continuous operation of this unit, which is interrupted only by actuation of switch 103, in response to a predetermined accumulation of ice cubes within the storage bin 96, or by actuation of the safety switch 109 of the present invention. A branch wire 128 leads from wire 127, between switch 103 and unit 51, and is connected to a movable arm 129 of the ice thickness thermostat switch 50. A second branch wire 131 leads from the wire 126, between switch 103 and unit 51, and is connected to a wire 132 which enters one side of a solenoid in valve 63. Wire 132 extends to the water pump motor 78. A wire 133 extends from the motor 78 of pump 76 and is connected to a contact 134 of the ice thickness thermostat switch 50. The other contact 136 of switch 50 is connected by a wire 137 with the solenoid in valve 63. The contact on arm 129 of switch 50 is adapted to alternately engage and/or disengage the contacts 134 and 136 in response to temperature conditions in the feeler receptacle 44 associated with the freezing member 23.

Operation

Assume that the ice cube maker is properly connected to a source of water supply under pressure, to a suitable drain and its electrical circuit is now energized. Electric current flows from the mains 111 and 112 through normally closed switch 103 to the motor of motor-compressor unit 51 to cause operation thereof. Simultaneously therewith electric current flows from transformer 116 through wires 117 and 118 and branch wires 121 and 122 to continuously energize the ice cutter 90 by directing thirty to thirty-five watts of current into the resistance wires 92 and 93 to cause these wires to be heated. A small amount of current, preferably one-half watt, flows through by-pass resistance 119 to the heating element 47 in the ice thickness feeler member or receptacle 44. At this same time electric current also flows through wire 128, arm 129, of switch 50, contact 134, then through wire 133 to water pump motor 78. The circuit is completed back to the power main 112 from motor 78 through wires 132, 131 and 126. Water fills receptacle 77 to a predetermined level under control of float valve 81. Solenoid valve 63 is closed while motor 78 operates. The pump 76 lifts water, from receptacle 77 by way of the two conduits 73, into header 66. Water is distributed in the form of a film upon the freezing plate portion of member 23 by the plurality of distributing orifices (not shown) in manifold header 66. Water leaving the evaporating means or evaporator member 23 flows downwardly in member 87 to the reservoir receptacle 77 wherewhereupon it is recirculated by pump 76 over evaporator member 23. The compressor of unit 51 withdraws refrigerant vapor from the evaporating passages in the freezing member 23, to cause chilling of this plate-like member, compresses the same and forwards the compressed refrigerant, through conduit 52, to condenser 53 where it is cooled and liquefied in any suitable manner such as by circulating room air over the condenser. Refrigerant liquefied in condenser 53 flows into receiver 54 where it is further cooled and collected. Liquid refrigerant enters conduit 56 and flows through expansion valve 57. Liquid refrigerant is directed to the evaporating passages of member 23, by expansion valve 57, wherein it vaporizes, in removing heat from member 23, and the evaporated refrigerant is returned through conduit 61 to the compressor of unit 51. The refrigerating effect produced by member 23 causes water from the film thereof flowing over the top surface of member 23 to freeze and accumulate thereon in the form of a layer or slab of ice. When the thickness of the layer or slab of ice on member 23 reaches the feeler receptacle 44 its temperature overcomes the small amount of heat imparted, by resistor 119, to heating element 47 and cools the coiled portion of tube 46. When the temperature of tube 46 is lowered to the desired point, in accordance with a predetermined thickness or accumulation of ice on member 23, element 49 of switch 50 will contract and move switch arm 129 away from contact 134 and into engagement with contact 136. When arm 129 disengages contact 134, of switch 50, the circuit to water pump motor 78 is broken or opened and when this arm engages contact 136 the circuit to the solenoid valve 63 is made or closed. Energization of the solenoid in valve 63 causes this valve to open and hot gaseous refrigerant is thereupon circulated from the receiver 54 and condenser 53 through conduit 62 and through the passages in the freezing means or evaporator member 23 and thence back to the compressor of unit 51 which continues to operate. The hot refrigerant gas warms freezing member 23 by its flow therethrough. The thermostatic switch 50 therefore serves as a means responsive to a predetermined accumulation or thickness of ice on member 23 to simultaneously stop the flow of water over the freezing member 23, to render the refrigerating means or member 23 ineffective, to produce refrigeration, and to render the heating means effective by opening valve 63 in the hot refrigerant gas line 62. Heat of the gaseous refrigerant flowing through the passages in member 23 melts and breaks the bond between the slab of ice previously formed on member 23. This released slab of ice moves off the inclined freezing member 23 by sliding therefrom onto the inclined ice dissector or grid 90.

As soon as the water pump motor 78 stops operating, water flowing over member 23 and water contained in the pipes 73 drains into the sump or receptacle 77 to raise the level of the body of water therein, over float 82, to a point above the uppermost portion of siphon pipe 86. This renders the siphon pipe 86 effective and water in the water sump is siphoned out of receptacle 77. Valve 81 insures an adequate supply of water in receptacle 77, for circulation to the water header 66, under normal conditions or during a freezing cycle while siphon pipe 86 drains water from the receptacle 77 after each freezing cycle. The draining of water from receptacle 77, after each freezing cycle, removes minerals from receptacle 77 and conveys the same down the pipe 86 to bin 96 and through drain pipe 99 to thus insure the production of pure, glistening clear ice cubes at each freezing cycle. While the siphoning device or pipe 86 removes most of the water from the elements located in the low temperature freezing zone or compartment 20 residual water may be trapped in valve 81, in the bottom of receptacle 77, in pump 76, and in any pockets present in the distributing conduits 73. Ordinarily residual water, in elements of the water distributing means located within compartment 20 does no harm when the refrigerating system is cyclically operating to successively produce a refrigerating cycle and warming cycle. However residue water in valve 81, receptacle 77, pump 76 and conduits 73 will, if the supply of water to the ice maker fails, freeze and cause considerable damage to the apparatus. According to my invention I provide in an apparatus of the type disclosed, means for preventing this residual water from freezing which will hereinafter be described.

As the slab of ice slides onto grid 90 it strikes the movable arm 108 of switch 105 and causes the contact 107 carried thereby to engage the stationary contact 106. Closing of contacts 106 and 107 causes the flow of about five watts of electric current, through wires 117 and 118, around or by-passing resistor 119, to the heating element 47 of the ice thickness thermostat. This increased heat, generated by the electric heating element 47, rapidly warms the coiled portion of tube 46 to thereby cause expansion of element 49 of switch 50. This provides a means for reducing the time between the removal of a slab of ice from freezing member 23 and a subsequent ice slab freezing cycle since the arm 129 of switch 50 will be quickly moved to engage contact 134, after a slab of ice leaves the member 23. In other words the interval of time between a warming cycle and a refrigerating cycle is reduced to a minimum to insure rapid production of ice cubes. Movement of arm 129 away from contact 136 of switch 50 deenergizes the solenoid valve 63 to cause closing thereof and engagement of arm 129 with switch contact 134 again energizes the water circulating pump motor 78. Heat of the one set of wires 92 in grid 90 cuts or dissects the slab of ice received thereby and resting thereon into a plurality of long narrow slabs which fall through the space between wires 92 onto the set of wires 93. The heat of wires 93 thereafter cuts or dissects the plurality of long narrow slabs of ice resting thereon into a plurality of ice cubelets which fall through grid 90 into the storage bin 96. The size of the ice cubelets or blocks dissected by grid 90 is 1¼ inches by 1½ inches and the thickness thereof is between ⅜ inch and ¾ inch as determined by the distance between feeler receptacle 44 and the flat top surface of member 23. These ice cubes can then be harvested from the cabinet 15 by opening the insulated door 97 and by tilting the inner bin door 98 forwardly. The alternate and successive freezing and ice releasing cycles continue until such time as the storage bin becomes substantially filled with ice blocks When the ice blocks accumulate in bin 96 to the point where they will contact the bin thermostat bulb 101 the bin thermostat switch 103 is actuated to open the electric circuit leading to motor compressor unit 51 and the other elements in the one hundred fifteen volt circuit of the ice cube maker. The other or transformer wire circuit remains energized at this time so as not to require reheating of wires 92 and 93 of grid or cutter 90 when the circuit to unit 51 is reestablished by bin thermostat switch 103. The cylindrical operation of the ice cube maker will be reestablished automatically after a sufficient number of ice cubes have been removed from the storage bin 96 or have melted so as to lower the level of the ice cubes below the thermostat bulb 101.

As hereinbefore stated residual water or water trapped in pipes 73, pump 76, receptacle 77 and in the housing of valve 81 will, if the supply of water to the ice maker cabinet 15 is interrupted or fails, freeze in these elements due to their being located in and exposed to the low freezing temperature produced in compartment 20 by the refrigerating means or evaporator 23. This freeze-up of the residual or trapped water in an apparatus of the type herein disclosed will at least prevent operation of pump 76 when its motor 78 is reenergized and prevent valve 81 from functioning and may even burst pipes 73, pump 76 and the housing of valve 81. In accordance with my invention I, in addition to providing means for preventing freezing of residual water in the elements described, also render operation of the ice making apparatus fully automatic under substantially all conditions. Should the pressure of water in the supply main leading to pipe 83 diminish below, say, for example, five pounds per square inch or be entirely interrupted or shut off the pressure responsive bellows 113, communicating with pipe 83 by way of pipe 114 and T connector 115, of snap switch 109 will contract to actuate or move the one movable contact 110 away from the other stationary contact of the switch. This opens the power main or conductor 111 to cut off the supply of electric current to the wiring circuits of the ice making apparatus and thereby renders all electrically energized elements thereof ineffective or inoperative. The cyclical operations of the refrigerating system associated with the apparatus are stopped and the cooling effect of the refrigerating means or evaporator 23 is limited or rendered ineffective to thereby cause its temperature to rise above freezing. Consequently the temperature within compartment 20 of cabinet 15 also increases above 32° F. and residual water trapped in pipes 73, receptacle 77, pump 76 and valve housing 81 is prevented from freezing. When water in the water main is again turned on the water pressure in the ice making apparatus supply pipe 83 is reestablished and increases above ten pounds per square inch. The bellows 113 thereupon expands to actuate the movable contact 110 of switch 109 into engagement with the other or stationary contact thereof. This closes the power main or conductor 111 to connect the source of electric current supply to the wiring circuits of the ice making apparatus. The successive cyclical operations of the refrigerating system associated with the apparatus are resumed to again cause the apparatus to continuously produce ice cubes, except when the circuit to the motor-compressor unit 51 of the refrigerating system is opened by switch 103 in response to a bin full of ice blocks or cubelets.

It should be apparent from the foregoing that I have provided an improved ice cubelet maker. In addition to providing means for preventing freeze-up of residual water in elements of the ice making apparatus, located within and exposed to the low temperature of the freezing compartment in the cabinet thereof, my invention also renders the apparatus fully automatic. The water pressure responsive device of the present ice making apparatus prevents certain elements thereof from becoming inoperative or broken when the supply of water thereto is interrupted or fails to thereby prolong the life of the ice maker.

While the form of embodiment of the invention as herein disclosed constitutes a preferred form, it is to be understood that other forms might be adopted, as may come within the scope of the claims which follow.

What is claimed is as follows:

1. An ice maker comprising in combination, a cabinet, a refrigerating system including a refrigerant evaporator within said cabinet and a refrigerant translating device, conduit means in said cabinet exposed to the temperature produced by said evaporator for directing water thereover, a make up water supply pipe for furnishing water under a normal substantially constant pressure to said conduit means, said refrigerating system being capable of reducing the temperature of said evaporator below 32° F. for freezing water directed thereover into ice, means actuated independently of conditions in said refrigerating system automatically and directly in response to a drop in pressure of water in said make up water supply pipe below said normal pressure therein to cause the temperature of said evaporator to increase above 32° F. and prevent freezing of water in the water directing conduit means within said cabinet, and said last named means also being actuated automatically in response to restoration of said normal water pressure in said make up water supply pipe for causing the temperature of said evaporator to be lowered below 32° F.

2. An ice maker comprising in combination, a cabinet, a refrigerating system including a refrigerant evaporator within said cabinet and a refrigerant translating device, conduit means in said cabinet exposed to the temperature produced by said evaporator for directing water thereover, a make up water supply pipe for furnishing water under a normal substantially constant pressure to said conduit means, said refrigerating system being capable of reducing the temperature of said evaporator below 32° F. for freezing water directed thereover into ice, a wiring circuit for said refrigerating system connected to a source of electric current supply, means interposed in said circuit and actuated independently of conditions in said refrigerating system automatically and directly in response to a drop in pressure of water in said make up water supply pipe below said normal pressure therein for stopping flow of electric current from said refrigerating source of supply to said circuit to render said refrigerating system inoperative and cause the temperature of said evaporator thereof to increase above 32° F. for preventing freezing of water in the water directing means within said cabinet, and said last named means also being actuated automatically in response to restoration of said normal water pressure in said make up water supply pipe for directing the flow of electric current to said circuit for rendering said refrigerating system operative to cause the temperature of said evaporator to be lowered below 32° F.

References Cited in the file of this patent

UNITED STATES PATENTS

| | | |
|---|---|---|
| 1,498,307 | Schultz | June 17, 1924 |
| 1,875,254 | Munce | Aug. 30, 1932 |
| 2,364,559 | Storer | Dec. 5, 1944 |
| 2,475,343 | Wellman | July 5, 1949 |
| 2,532,074 | Poukhlovsky | Nov. 28, 1950 |
| 2,597,008 | Lee | May 20, 1952 |
| 2,628,296 | Dillman | Feb. 10, 1953 |
| 2,633,005 | Lauer | Mar. 31, 1953 |
| 2,648,956 | Fletcher | Aug. 18, 1953 |
| 2,657,547 | Heuser | Nov. 3, 1953 |
| 2,680,168 | Murphy | June 1, 1954 |
| 2,682,155 | Ayres | June 29, 1954 |
| 2,693,680 | Lee | Nov. 9, 1954 |
| 2,717,495 | Andersson | Sept. 13, 1955 |
| 2,717,499 | Ashby | Sept. 13, 1955 |
| 2,717,502 | Barton | Sept. 13, 1955 |

OTHER REFERENCES

Air Conditioning and Refrigeration News, February 25, 1952, page 11.